United States Patent
Wang

(10) Patent No.: US 8,531,112 B2
(45) Date of Patent: Sep. 10, 2013

(54) LED DRIVING CIRCUIT AND PROTECTING CIRCUIT THEREOF

(75) Inventor: Chen-Hsung Wang, New Taipei (TW)

(73) Assignee: Green Solution Technology Co., Ltd, New Taipei (TW)

( * ) Notice: Subject to any disclaimer, the term of this patent is extended or adjusted under 35 U.S.C. 154(b) by 274 days.

(21) Appl. No.: 13/107,946

(22) Filed: May 15, 2011

(65) Prior Publication Data
US 2012/0286667 A1    Nov. 15, 2012

(51) Int. Cl.
*H05B 37/02* (2006.01)
*H02H 9/04* (2006.01)

(52) U.S. Cl.
USPC .......................................... 315/119; 315/291

(58) Field of Classification Search
None
See application file for complete search history.

(56) References Cited

U.S. PATENT DOCUMENTS

2010/0201283 A1* 8/2010 Kawata et al. ................. 315/287
2011/0050131 A1* 3/2011 Je et al. ......................... 315/297

* cited by examiner

*Primary Examiner* — Crystal L Hammond
(74) *Attorney, Agent, or Firm* — Jianq Chyun IP Office

(57) ABSTRACT

An LED driving circuit for driving an LED module is provided. The LED module is coupled to an inductor and a flywheel unit to provide a continuous current conduction of the inductor. A terminal of a converting switch is coupled to the LED module, and another terminal thereof is coupled to ground through a current detection unit that generates a current feedback signal to a controller, so as to stabilize a current flowing through the LED module. The LED driving circuit also includes a protecting circuit, which detects a potential of one end of the LED module to generate a detection signal and makes/has the converting switch to be turned off responsive to the detection signal. If the converting switch is turned off, driving of the LED module is stopped.

4 Claims, 3 Drawing Sheets

LED DRIVING CIRCUIT AND PROTECTING CIRCUIT THEREOF

BACKGROUND

1. Field of the Invention

The present invention relates to a light emitting diode (LED) driving circuit and a protecting circuit thereof. Particularly, the present invention relates to an LED driving circuit having a short-circuit protection function and a protecting circuit thereof

2. Description of Related Art

FIG. 1 is a circuit schematic diagram of a conventional light emitting diode (LED) driving circuit. The LED driving circuit includes an inductor L, a transistor M, a diode D, a current detecting resistor RI and a controller 20. One end of the inductor L is coupled to an input power Vin, and a waveform of the input power Vin is a M-shaped wave obtained after an alternating power source is rectified by a bridge rectifier. Another end of the inductor L is coupled to a positive end of an LED module 10. A negative end of the LED module 10 is coupled to a first terminal of the transistor M, and a second terminal of the transistor M is coupled to ground through the current detecting resistor RI. An anode of the diode D is coupled to the first terminal of the transistor M, and a cathode of the diode D is coupled to the inductor L for providing a continuous current conduction of the inductor L.

The controller 20 is an integrated circuit, which is packaged as a single package structure, and has a feedback terminal FB, a power terminal VD, a driving terminal DR, a ground terminal GN, etc. The power terminal VD of the controller 20 is coupled to a driving power source VDD for receiving required power for operation, and the ground terminal GN is coupled to the ground. When the transistor M is turned on, a current of the LED module 10 flows to the ground through the transistor M and the current detecting resistor RI and so the current detecting resistor RI generates a current feedback signal Ifb. The controller 20 receives the current feedback signal Ifb, and accordingly turns on/off the transistor M to stabilize the current flowing through the LED module 10.

However, when the LED module is short-circuited due to circuit abnormity, the controller 20 does not enter a protection mode to stop driving the LED module 10, which may cause a problem that a user probably touches the LED driving circuit for confirming the problem of the LED driving circuit, which is dangerous to personal safety, or even semiconductor devices are probably damaged due to the short circuit of the LED.

SUMMARY OF THE INVENTION

In the related art, when the LED module is short-circuited, it is liable to cause unnecessary power consumption or damage of semiconductor devices, or even a risk of personal safety. In the invention, a potential of an LED module is detected to stop a current flowing through the LED module when the LED module is short-circuited due to circuit abnormity.

The invention provides a protecting circuit, which is adapted to detect a potential of one end of a load to determine whether or not to make a converting switch that is coupled to the load be turned off The protecting circuit includes a detection unit and an abnormal state protection unit. The detection unit is coupled to the end for generating a detection signal according to the potential of the end. The abnormal state protection unit receives the detection signal, and turns off the converting switch to stop a current flowing through the load when the detection signal indicates that the load is in a short-circuit abnormal state.

The invention provides a light emitting diode (LED) driving circuit including an LED module, an inductor, a flywheel unit, a converting switch, a controller and a protecting circuit. One end of the flywheel unit is coupled to the LED module, and another end thereof is coupled to the inductor for providing a continuous current conduction of the inductor. One terminal of the converting switch is coupled' to the LED module, and another terminal thereof is coupled to ground through a current detection unit that generates a current feedback signal. The controller is coupled to a control terminal of the converting switch, and controls a magnitude of the current flowing through the LED module according to the current feedback signal, so as to stabilize a current flowing through the LED module. The protecting circuit detects a potential of one end of the LED module for generating a detection signal, and makes/has the converting switch to be turned off responsive to the detection signal. When the protecting circuit determines that the LED driving circuit is short-circuited, the converting switch is locks to a turn-off state.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
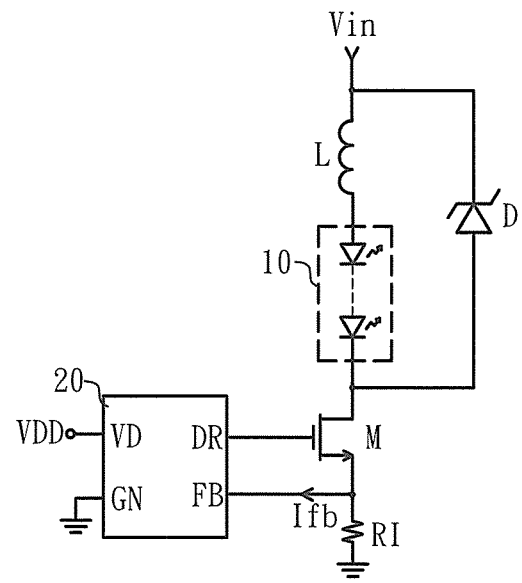
FIG. 1 is a circuit schematic diagram of a conventional light emitting diode (LED) driving circuit.
Figure 2:
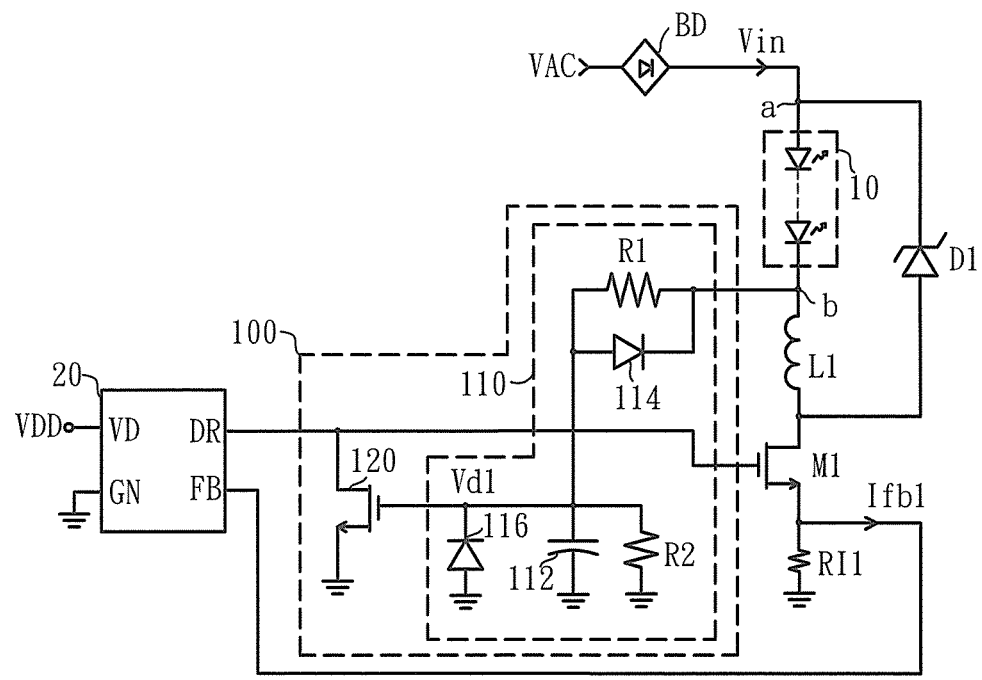
FIG. 2 is a circuit schematic diagram of an LED driving circuit according to a first exemplary embodiment of the invention.

FIG. 2 is a circuit schematic diagram of a light emitting diode (LED) driving circuit according to a first exemplary embodiment of the invention. Referring to FIG. 2, the LED driving circuit includes an LED module 10, an inductor L1, a flywheel unit D1, a converting switch M1, a controller 20 and a protecting circuit 100. One end a of the LED module 10 is coupled to an alternating current (AC) power VAC, and the AC power VAC is rectified by a bridge rectifier BD to generate an input power Vin. Another end b of the LED module 10 is coupled to one end of the inductor L1, and another end of the inductor L1 is coupled to a first terminal of the converting switch M1, and a second terminal of the converting switch M1 is coupled to ground through a current detection unit RI1 and so the current detection unit RI1 generates a current feedback signal Ifb1. An anode end of the flywheel unit D1 is coupled to the first terminal of the converting switch M1, and a cathode end of the flywheel unit D1 is coupled to the inductor L1 for providing a continuous current conduction of the inductor L1. The controller 20 has a feedback terminal FB, a power terminal VD, a driving terminal DR and a ground terminal GN, etc. The power terminal VD of the controller 20 is coupled to a driving power source VDD for receiving required power for operation, and the ground terminal GN is coupled to the ground. The driving terminal DR is coupled to a control terminal of the converting switch M1, the feedback terminal FB receives the current feedback signal Ifb1, and the controller 20 accordingly turns on/off the converting switch M1 to stabilize the current flowing through the LED module 10.

The protecting circuit 100 includes a detection unit 110 and an abnormal state protection unit 120. The protecting circuit 100 detects a potential of the end b of the LED module 10, and accordingly determines whether or not to turn off the converting switch M1. The detection unit 110 includes a voltage-dividing unit, a peak-valley detecting unit, and a clamp unit 116. The voltage-dividing unit is coupled to the end b, and includes two resistors R1 and R2 connected in series. The peak-valley detecting unit includes a capacitor 112 and a diode 114 connected in series and is coupled to the end b and the connecting point of the resistors R1 and R2 for detecting a valley potential of the end b, and, generating a detection signal Vd1. The clamp unit 116 is coupled to a connecting point of the capacitor 112 and the diode 114 for clamping the detection signal Vd1 over a first potential value. In the present embodiment, the abnormal state protection unit 120 is a transistor switch with one terminal coupled to the control terminal of the converting switch M1 and another terminal coupled to the ground, and a control terminal of the abnormal state protection unit 120 receives the detection signal Vd1. When the end a and the end b of the LED module 10 are short-circuited, the abnormal state protection unit 120 turns off the converting switch M1 to protect the circuit, i.e. to stop the current flowing through the LED module 10.

A waveform of the input power Vin is M-shaped wave. When a potential of the input power Vin is higher than a second potential value, the LED module 10 is conducted and a current may flow there through, and the capacitor 112 starts to slowly store energy via the resistor R1. When the potential of the input power Vin is decreased to be lower than the second potential value, a continuous current conduction of the inductor L1 is implemented through the diode D1, so that the potential of the end b is lower than 0 volt. Meanwhile, the capacitor 112 quickly releases energy through the diode 114, and is clamped to the first potential value by the clamp unit 116. The LED driving circuit repeats the above circuit operations, and the potential of the detection signal Vd1 is oscillated within a small potential range over the first potential value. Therefore, the potential of the detection signal Vd1 is inadequate to conduct the abnormal state protection unit 120, and at this time, the protecting circuit 100 is in a first state. When the end a and the end b of the LED module 10 are short-circuited, the capacitor 112 may slowly store energy to pull up the potential of the detection signal Vd1 to a level adequate to conduct the abnormal state protection unit 120, and at this time, the protecting circuit 100 is in a second state. After the abnormal state protection unit 120 is conducted, a gate potential of the converting switch M1 is pulled down, so that the converting switch M1 is turned off to stop the current flowing through the LED module 10.

Figure 3:
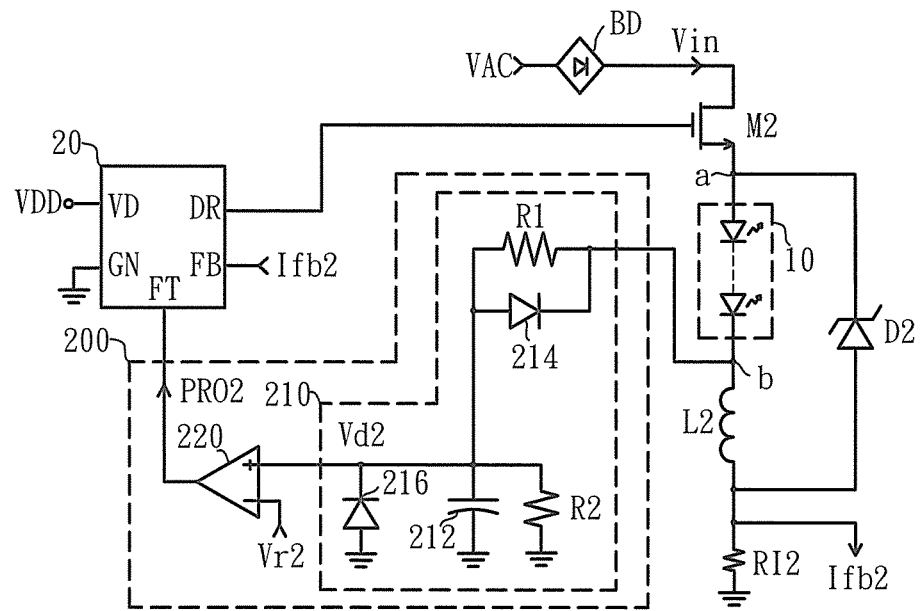
FIG. 3 is a circuit schematic diagram of an LED driving circuit according to a second exemplary embodiment of the invention.

FIG. 3 is a circuit schematic diagram of an LED driving circuit according to a second exemplary embodiment of the invention. The LED driving circuit includes an LED module 10, an inductor L2, a flywheel unit D2, a converting switch M2, a controller 20 and a protecting circuit 200. One terminal of the converting switch M2 is coupled to an input power Vin, where the input power Vin is generated by rectifying an AC power VAC through a bridge rectifier BD. Another terminal of the converting switch M2 is coupled to an end a of the LED module 10, and another end b of the LED module 10 is coupled to one end of the inductor L2, and another end of the inductor L2 is coupled to the ground through a current detection unit RI2 and so the current detection unit RI2 generates a current feedback signal Ifb2. An anode end of the flywheel unit D2 is coupled to the other end of the inductor L2, and a cathode end of the flywheel unit D2 is coupled to the end a of the LED module 10 to form a loop for providing a continuous current conduction of the inductor L2. The controller 20 has a feedback terminal FB, a power terminal VD, a driving terminal DR and a ground terminal GN, etc. The power terminal VD of the controller 20 is coupled to a driving power source VDD for receiving required power for operation, and the ground terminal GN is coupled to the ground. The driving terminal DR is coupled to a control terminal of the converting switch M2, the feedback terminal FB receives the current feedback signal Ifb2, and the controller 20 accordingly turns on/off the converting switch M2 to stabilize the current flowing through the LED module 10.

The protecting circuit 200 includes a detection unit 210 and an abnormal state protection unit 220. The protecting circuit 200 detects a potential of the end b of the LED module 10, and accordingly determines whether or not to turn off the converting switch M2 indirectly, i.e., make the controller 20 to turn off the converting switch M2. The detection unit 210 includes a voltage-dividing unit, a peak-valley detecting unit, and a clamp unit 216. The voltage-dividing unit includes two resistors R1 and R2, and the peak-valley detecting unit includes a capacitor 212 and a diode 214, where a circuit operation method of the detection unit 210 is similar to that of the detection unit 110 of FIG. 2, so that detailed descriptions thereof are not repeated. In the embodiment, the abnormal state protection unit 220 is a comparator. A non-inverting terminal of the abnormal state protection unit 220 receives a detection signal Vd2 generated by the detection unit 210, and an inverting terminal thereof receives a reference potential Vr2, and accordingly the abnormal state protection unit 220 generates a protection signal PRO2 to the controller 20. Compared to the embodiment of FIG. 2, the controller 20 further includes a false terminal FT, and the false terminal FT receives the protection signal PRO2, and the controller 20 accordingly determines whether or not to enter the protection mode. When the protecting circuit 200 is in the first state, a circuit operation method thereof is similar to that of the protecting circuit 100 of FIG. 2 in the first state, so that detailed descriptions thereof are not repeated. When the protecting circuit 200 is in the second state, the controller 20 receives a high level protection signal PRO2 to stop driving the converting switch M2, and meanwhile the converting switch M2 is in a turn-off state to stop driving the LED module 10.

Figure 4:
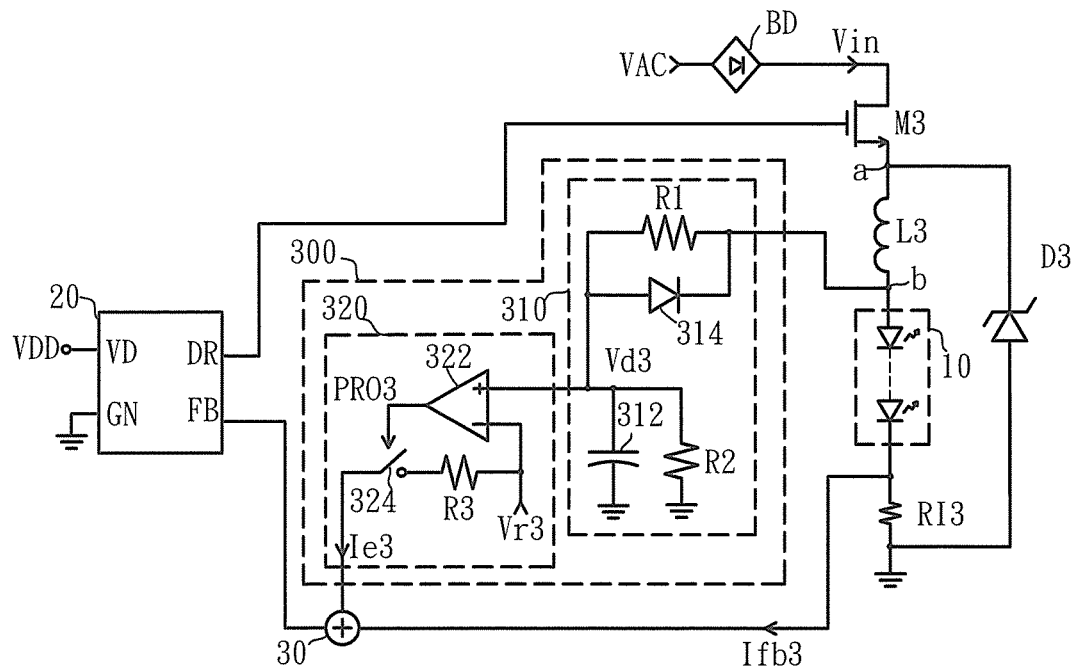
FIG. 4 is a circuit schematic diagram of an LED driving circuit according to a third exemplary embodiment of the invention.

Then, referring to FIG. 4, FIG. 4 is a circuit schematic diagram of an LED driving circuit according to a third exemplary embodiment of the invention. The LED driving circuit includes a converting switch M3, an inductor L3, an LED module 10, a flywheel unit D3, a controller 20 and a protecting circuit 300. One terminal of the converting switch M3 is coupled to an input power Vin, where the input power Vin is generated by rectifying an AC power VAC through a bridge rectifier BD. Another terminal of the converting switch M3 is coupled to an end a of the inductor L3, and another end b of the inductor L3 is coupled to one end of the LED module 10, and another end of the LED module 10 is coupled to the ground through a current detection unit RI3 and so the current detection unit RI3 generates a current feedback signal Ifb3 to a summing unit 30. An anode end of the flywheel unit D3 is coupled to the ground, and a cathode end of the flywheel unit D3 is coupled to the end a to form a loop for providing a continuous current conduction of the inductor L3. The controller 20 has a feedback terminal FB, a power terminal VD, a driving terminal DR and a ground terminal GN, etc. The power terminal VD of the controller 20 is coupled to a driving power source VDD for receiving required power for operation, and the ground terminal GN is coupled to the ground. The driving terminal DR is coupled to a control terminal of the converting switch M3, the controller 20 is coupled to the summing unit 30 through the feedback terminal FB, and turns on/off the converting switch M3 according to the current feedback signal Ifb3, so as to stabilize the current flowing through the LED module 10.

The protecting circuit 300 includes a detection unit 310 and an abnormal state protection unit 320. The protecting circuit 300 detects a potential of the LED module 10, and accordingly determines whether or not to turn off the converting switch M3. The detection unit 310 includes a voltage-dividing unit and a peak-valley detecting unit. The voltage-dividing unit is coupled to the end b, and includes two resistors R1 and R2 connected in series. The peak-valley detecting unit includes a capacitor 312 and a diode 314 connected in series, and is coupled to the end b and the connecting point of the resistors R1 and R2 for detecting a valley potential of the end b and generating a detection signal Vd3. The abnormal state protection unit 320 includes a determination unit 322 and a level regulation unit 324. The determination unit 322 is a comparator, where a non-inverting terminal of the determination unit 322 receives the detection signal Vd3, and an inverting terminal thereof receives a reference potential Vr3, and accordingly the determination unit 322 generates a protection signal PRO3. The level regulation unit 324 receives the reference signal Vr3 through a resistor R3, and determines whether or not to generate a summing signal Ie3 to the summing unit 30 according to the protection signal PRO3, so that the controller 20 controls to turn off the converting switch M3 according to a summing result of the current feedback signal Ifb3 and the summing signal Ie3, so as to prevent damage of the semiconductor devices due to short circuit of the LED module 10. When the protecting circuit 300 is in a first state, the protection signal PRO3 is at a low level, and the level regulation unit 324 is turned off. Meanwhile, the controller 20 controls to turn on/off the converting switch M3 according to the current feedback signal Ifb3. The input power Vin is provided to the LED module 10, when the input power Vin is higher than a second potential value that is adequate to light the LED module 10, the capacitor 312 starts to store energy. When the input power Vin is lower than the second potential value, the potential of the end b is lower than 0 volt due to a continuous current conduction of the inductor L3, and the capacitor 312 quickly releases energy through the diode 314 to store the valley potential of the end b. When the protecting circuit 300 is in a second state, i.e. the end a and the end b are short-circuited, the detection signal Vd3 is higher than the reference signal Vr3, so that the protection signal PRO3 become a high level to turn on the level regulation unit 324. Meanwhile, the summing unit 30 sums the current feedback signal Ifb3 and the summing signal Ie3 for outputting to the controller 20, and makes the controller 20 to continuously determine that the current flowing through the LED module 10 is higher than an over current value and so the controller 20 turns off the converting switch M3, so as to protect the LED driving circuit.

Figure 5:
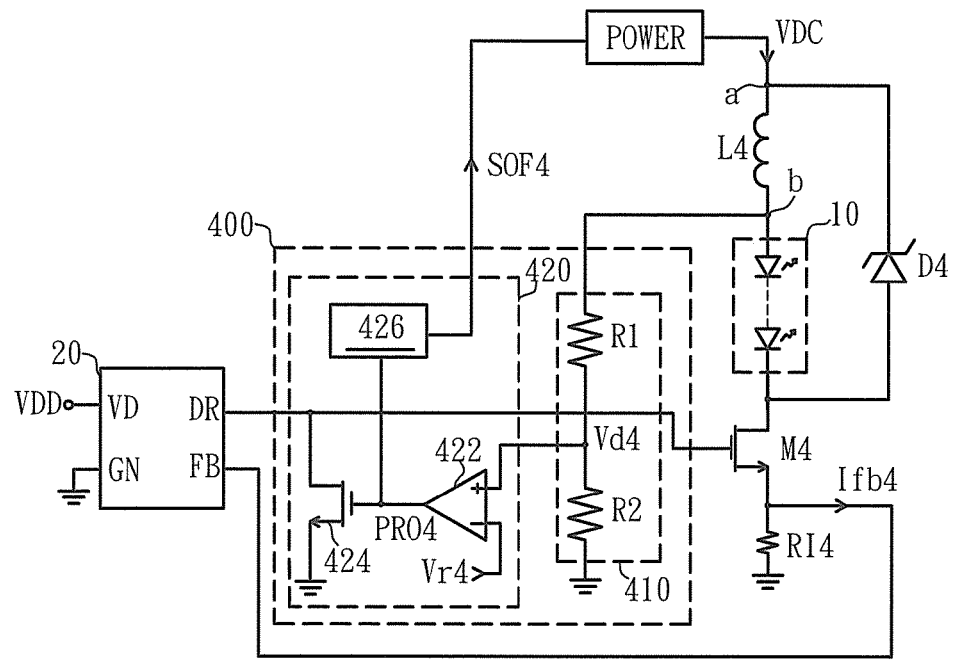
FIG. 5 is a circuit schematic diagram of an LED driving circuit according to a fourth exemplary embodiment of the invention.

Moreover, referring to FIG. 5, FIG. 5 is a circuit schematic diagram of an LED driving circuit according to a fourth exemplary embodiment of the invention. The LED driving circuit includes an inductor L4, an LED module 10, a flywheel unit D4, a converting switch M4, a controller 20 and a protecting circuit 400. One end of the inductor L4 is coupled to a direct current (DC) power VDC, where the DC power VDC is generated by an input unit POWER. Another end b of the inductor L4 is coupled to one end of the LED module 10, and another end of the LED module 10 is coupled to a first terminal of the converting switch M4, and a second terminal of the converting switch M4 is coupled to the ground through a current detection unit RI4 and so the current detection unit RI4 generates a current feedback signal Ifb4. An anode end of the flywheel unit D4 is coupled to the first terminal of the converting switch M4, and a cathode end of the flywheel unit D4 is coupled to the end a of the inductor L4 for providing a continuous current conduction of the inductor L4. The controller 20 has a feedback terminal FB, a power terminal VD, a driving terminal DR and a ground terminal GN, etc. The power terminal VD of the controller 20 is coupled to a driving power source VDD for receiving required power for operation, and the ground terminal GN is coupled to the ground. The driving terminal DR is coupled to a control terminal of the converting switch M4, the feedback terminal FB receives the current feedback signal Ifb4, and the controller 20 accordingly turns on/off the converting switch M4 to stabilize the current flowing through the LED module 10.

The protecting circuit 400 includes a detection unit 410 and an abnormal state protection unit 420. The protecting circuit 400 detects a potential of the LED module 10, and accordingly determines whether or not to turn off the converting switch M4. The detection unit 410 includes a voltage-dividing unit coupled to the end b. The voltage-dividing unit includes two resistors R1 and R2 connected in series, and generates a detection signal Vd4 at a connecting point of the resistors R1 and R2. The abnormal state protection unit 420 includes a determination unit 422, a level regulation unit 424 and a delay counting unit 426. In the embodiment, the determination unit 422 is a comparator. A non-inverting terminal of the determination unit 422 receives the detection signal Vd4, and an inverting terminal thereof receives a reference potential Vr4, and accordingly the determination unit 422 generates a protection signal PRO4. One terminal of the level regulation unit 424 is coupled to the control terminal of the converting switch M4, another terminal thereof is coupled to the ground, and a control terminal of the level regulation unit 424 receives the protection signal PRO4. The delay counting unit 426 receives the protection signal PRO4, and determines whether the protection signal PRO4 is at high level for a predetermined time period, and if yes, the delay counting unit 426 generates a disable signal SOF4 to the input unit POWER. When the protecting circuit 400 is in a first state, the protection signal PRO4 is at low level, so that the level regulation unit 424 is turned off and the disable signal SOF4 is at low level. Now, the input unit POWER provides the DC power VDC to drive the LED module 10. When the protecting circuit 400 is in a second state, the protection signal PRO4 is at high level, so that the level regulation unit 424 is turned on and the disable signal SOF4 is at high level. At this time, the input unit POWER stops providing the DC power VDC to drive the LED module 10. Meanwhile, the converting switch M4 is in a turn-off state to stop driving the LED module 10. In the present embodiment, the protecting circuit 400 can disable the input unit POWER when the LED module 10 is short-circuited, so as to protect the LED driving circuit.

Figure 6:
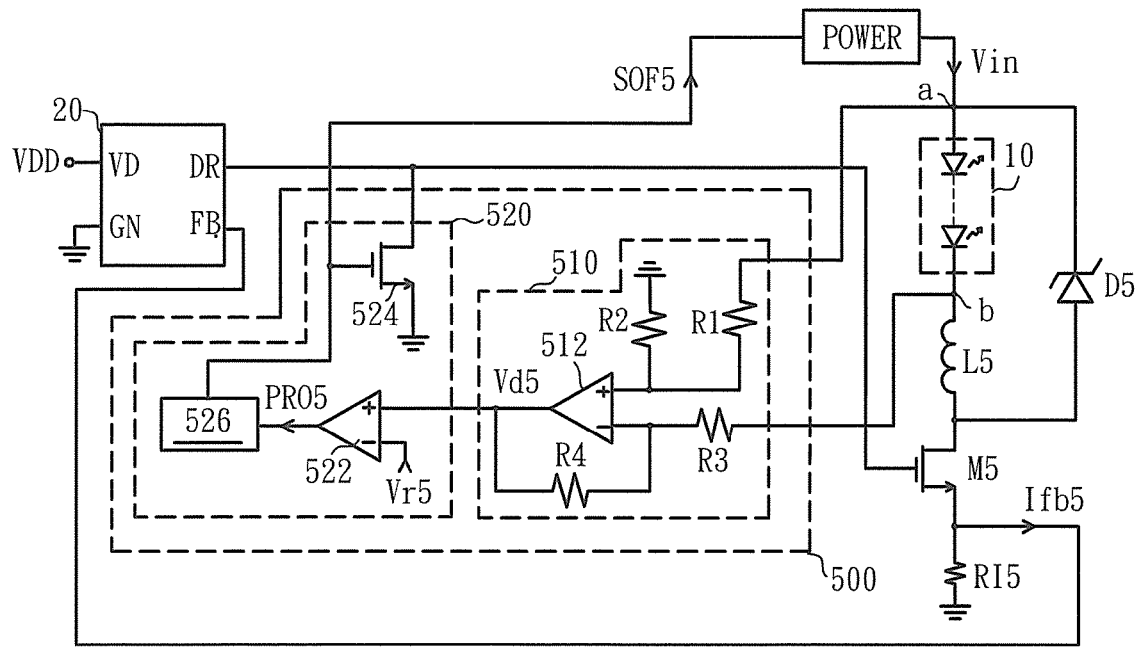
FIG. 6 is a circuit schematic diagram of an LED driving circuit according to a fifth exemplary embodiment of the invention.

Then, referring to FIG. 6, FIG. 6 is a circuit schematic diagram of an LED driving circuit according to a fifth exemplary embodiment of the invention. The LED driving circuit includes an LED module 10, an inductor L5, a flywheel unit D5, a converting switch M5, a controller 20 and a protecting circuit 500. One end a of the LED module 10 is coupled to an input power Vin, where the input power Vin is generated by an input unit POWER. Another end b of the LED module 10 is coupled to one end of the inductor L5, and another end of the inductor L5 is coupled to one terminal of the converting switch M5, and another terminal of the converting switch M5 is coupled to the ground through a current detection unit RI5 to generate a current feedback signal Ifb5. An anode end of the flywheel unit D5 is coupled to the inductor L5, and a cathode end of the flywheel unit D5 is coupled to the end a of the LED module 10 for providing a continuous current conduction of the inductor L5. The controller 20 has a feedback terminal FB, a power terminal VD, a driving terminal DR and a ground terminal GN, etc. The power terminal VD of the controller 20 is coupled to a driving power source VDD for receiving required power for operation, and the ground terminal GN is coupled to the ground. The driving terminal DR is coupled to a control terminal of the converting switch M5, the feedback terminal FB receives the current feedback signal Ifb5, and the controller 20 accordingly turns on/off the converting switch M5 to stabilize the current flowing through the LED module 10.

The protecting circuit 500 includes a detection unit 510 and an abnormal state protection unit 520. The protecting circuit 500 detects a potential of the LED module 10, and accordingly determines whether or not to turn off the converting switch M5. The detection unit 510 is a subtraction unit having an amplifier 512. A non-inverting terminal of the amplifier 512 is coupled to the end a through a resistor R1, and one end of a resistor R2 is coupled to the non-inverting terminal of the amplifier 512, and another end of the resistor R2 is coupled to the ground. An inverting terminal of the amplifier 512 is coupled to the end b through a resistor R3, and a resistor R4 is coupled between the inverting terminal and an output terminal of the amplifier 512, and accordingly the amplifier 512 generates a detection signal Vd5. In the present embodiment, the resistor R1 and the resistor R3 have a same resistance value, and the resistor R2 and the resistor R4 have a same resistance value. In the detection unit 510, the detection signal Vd5 is (R2/R1)×(a potential of the end a–a potential of the end b). Moreover, potentials of the non-inverting terminal and the inverting terminal of the amplifier 512 can be adjusted by adjusting a ratio of the resistor R1 and the resistor R2, so that the user can avoid damage of the amplifier 512 due to an excessively high detection potential by adjusting the resistances of the resistors. The abnormal state protection unit 520 includes a determination unit 522, a level regulation unit 524 and a delay counting unit 526. In the embodiment, the determination unit 522 is a comparator, and an inverting terminal of the determination unit 522 receives a reference potential Vr5, and a non-inverting terminal thereof receives the detection signal Vd5, and accordingly the determination unit 522 generates a protection signal PROS. The delay counting unit 526 receives the protection signal PROS, and determines whether the protection signal PROS is at high level during a predetermined time period, and if yes, the delay counting unit 526 generates a disable signal SOF5 to the input unit POWER. One terminal of the level regulation unit 524 is coupled to the control terminal of the converting switch M5, another terminal thereof is coupled to the ground, and a control terminal of the level regulation unit 524 is coupled to the delay counting unit 526. When the level regulation unit 524 receives the disable signal SOF5, the level regulation unit 524 turns the converting switch M5 off. When the protecting circuit 500 is in a first state, the detection signal Vd5 is higher than the reference potential Vr5, so that the protection signal PROS is at high level. Now, the delay counting unit 526 outputs the disable signal SOF5 of a low level to turn off the level regulation unit 524 when detecting the high level protection signal PROS for a predetermined time period. Now, the input unit POWER provides the input power Vin to the LED module 10, and since a circuit operation method of the protecting circuit 500 is similar to that of the protecting circuit 100 of FIG. 2 in the first state, detailed descriptions thereof are not repeated. When the protecting circuit 500 is in a second state, the protection signal PROS is at low level, and the delay counting unit 526 outputs the high level disable signal SOF5 to turn on the level regulation unit 524. Now, the input unit POWER receives the high level disable signal SOF5 and so stops providing the input power Vin to the LED module 10. Meanwhile, the converting switch M5 is in a turn-off state to stop driving the LED module 10.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A light emitting diode (LED) driving circuit, comprising:
    an LED module;
    an inductor, coupled to the LED module;
    a flywheel unit, having one end coupled to the LED module, and another end coupled to the inductor, for providing a continuous current conduction of the inductor;
    a converting switch, having one terminal coupled to the LED module, and another terminal coupled to ground through a current detection unit that generates a current feedback signal;
    a controller, coupled to a control terminal of the converting switch to control a magnitude of the current flowing through the LED module according to the current feedback signal, so as to stabilize a current flowing through the LED module; and
    a protecting circuit, detecting a potential of one end of the LED module to generate a detection signal, and making the converting switch to be turned off responsive to the detection signal,
    wherein when the protecting circuit determines that the LED driving circuit is short-circuited, the converting switch is locked to a turn-off state.

2. The LED driving circuit as claimed in claim 1, wherein when the protection circuit determines that the LED driving circuit is short-circuited, the protecting circuit adjusts a level of a current feedback signal indicative of a current flowing through the LED module, and so makes the controller to continuously determine that the current flowing through the LED module is higher than an over-current value so as to turn off the converting switch.

3. The LED driving circuit as claimed in claim 1, wherein the protection circuit comprises a delay counting unit for generating a disable signal when determining that the LED driving circuit is short-circuited for a predetermined time period.

4. The LED driving circuit as claimed in claim 1, wherein the protection circuit generates a protection signal when determining that the LED driving circuit is short-circuited, and the controller turns the converting switch off responsive to the protection signal.

* * * * *